(No Model.) 4 Sheets—Sheet 1.

A. DELUG.
ROLL HOLDING CAMERA.

No. 521,563. Patented June 19, 1894.

Attest:
A. J. Birney
F. H. Schott

Inventor.
Alois Delug
by MacKenzie
Atty (No Model.) 4 Sheets—Sheet 2.

A. DELUG.
ROLL HOLDING CAMERA.

No. 521,563. Patented June 19, 1894.

Attest:
A. J. Birney
F. H. Schott

Inventor.
Alois Delug
by Max Gengü
Atty.

(No Model.) 4 Sheets—Sheet 3.
A. DELUG.
ROLL HOLDING CAMERA.
No. 521,563. Patented June 19, 1894.
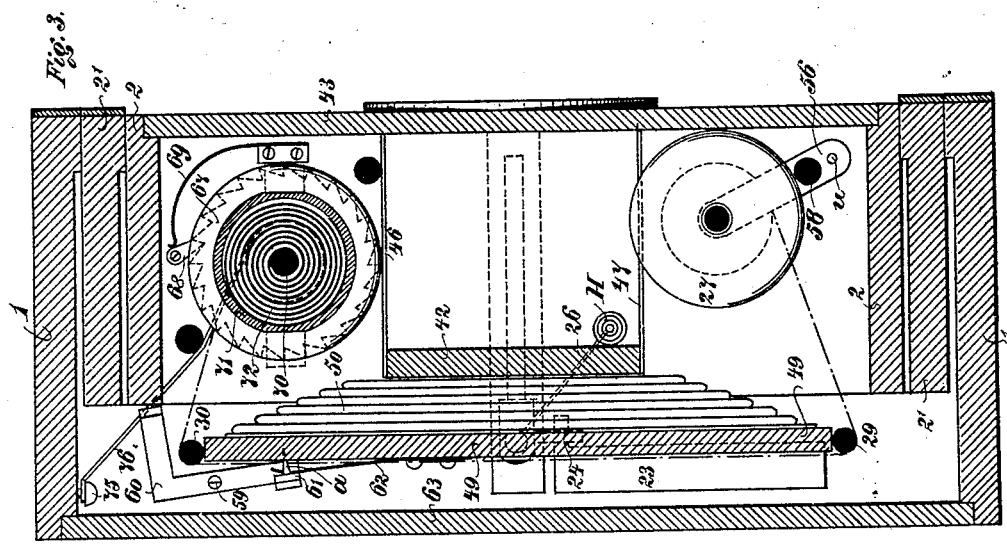
Attest:
A. J. Birney.
F. H. Schott
Inventor.
Alois Delug
by Mas Bengü
Atty (No Model.) 4 Sheets—Sheet 4.
A. DELUG.
ROLL HOLDING CAMERA.
No. 521,563. Patented June 19, 1894.
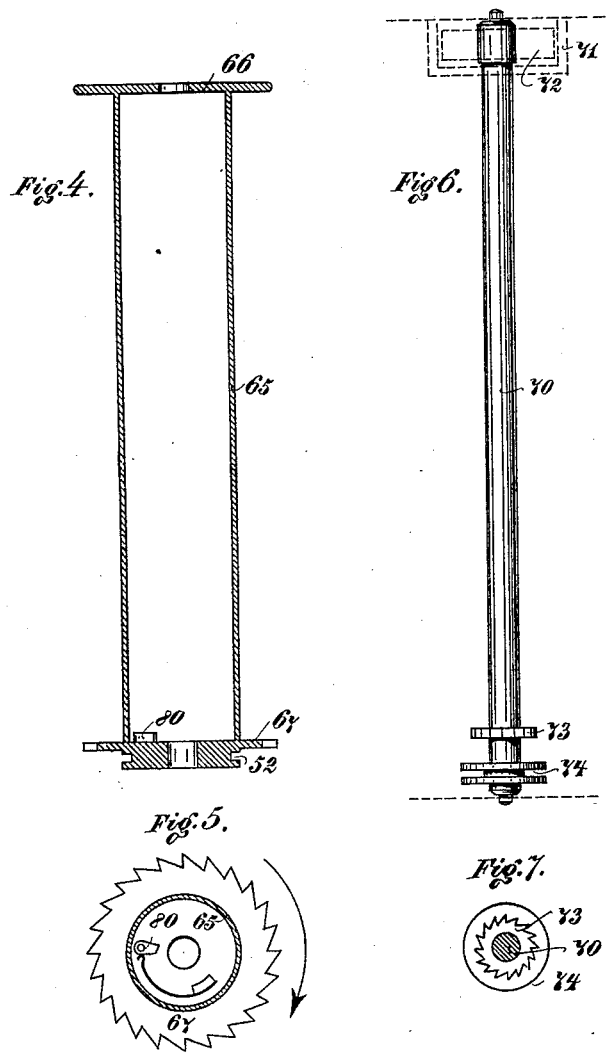

UNITED STATES PATENT OFFICE.

ALOIS DELUG, OF STUTTGART, GERMANY.

ROLL-HOLDING CAMERA.

SPECIFICATION forming part of Letters Patent No. 521,563, dated June 19, 1894.

Application filed August 11, 1893. Serial No. 482,931. (No model.) Patented in Germany March 16, 1892, No. 67,626, and March 26, 1893, No. 74,154, and in England July 20, 1893, No. 14,045.

*To all whom it may concern:*

Be it known that I, ALOIS DELUG, a subject of the King of Bavaria, residing at Stuttgart, in Würtemberg, in the German Empire, have invented certain new and useful Improvements in Roll-Holding Cameras, (patented in Germany, No. 67,626, dated March 16, 1892, and No. 74,154, dated March 26, 1893; also patented in England, No. 14,045, dated July 20, 1893,) of which the following is a specification.

My invention relates to improvements in photographic cameras.

The object of this invention is to make an apparatus for photographic purposes, which, by a single manipulation, will perform all the necessary operations preparatory to taking a picture, such as placing the sensitive film in the illuminating cone, setting the shutter, &c., automatically. This is particularly desirable when taking instantaneous pictures of moving objects, for, with ordinary apparatus, the proper or favorable moment of taking a picture is often lost, on account of the necessary manipulation.

Figure 1:
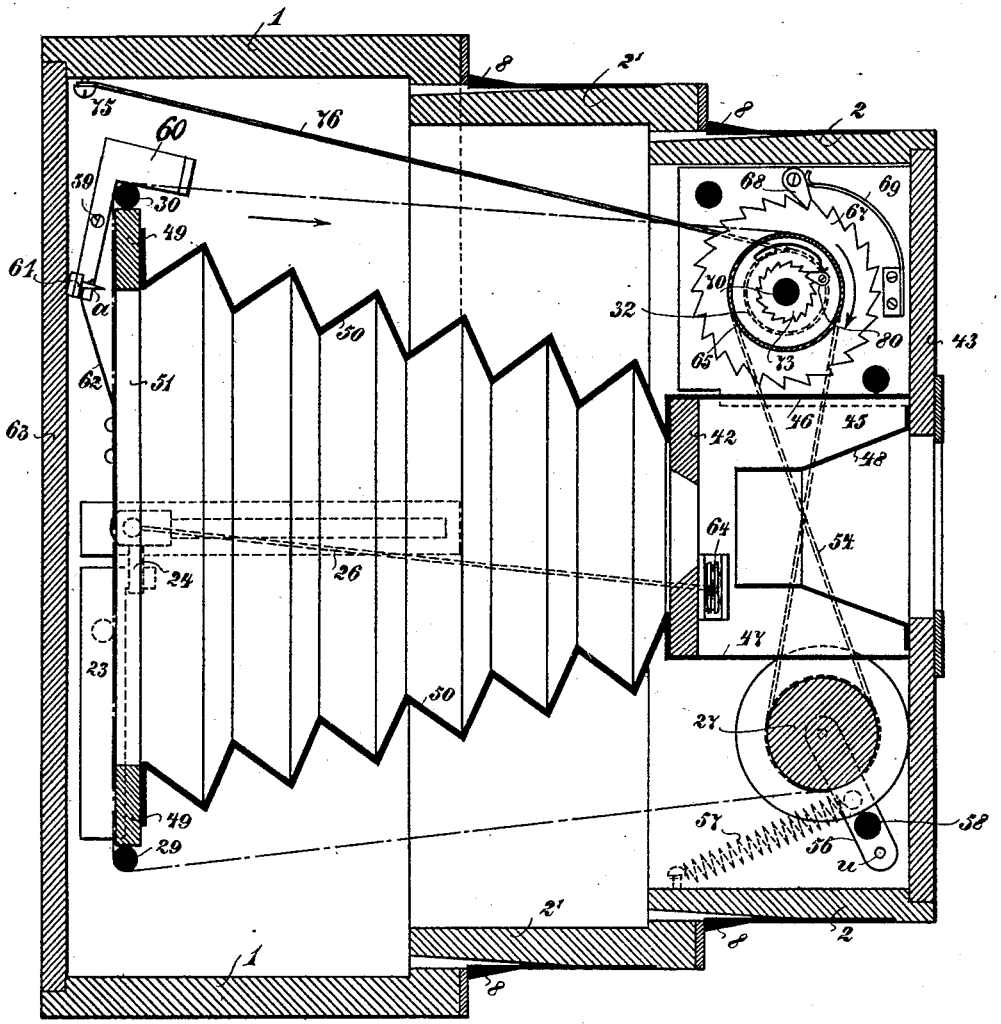
Figure 2:
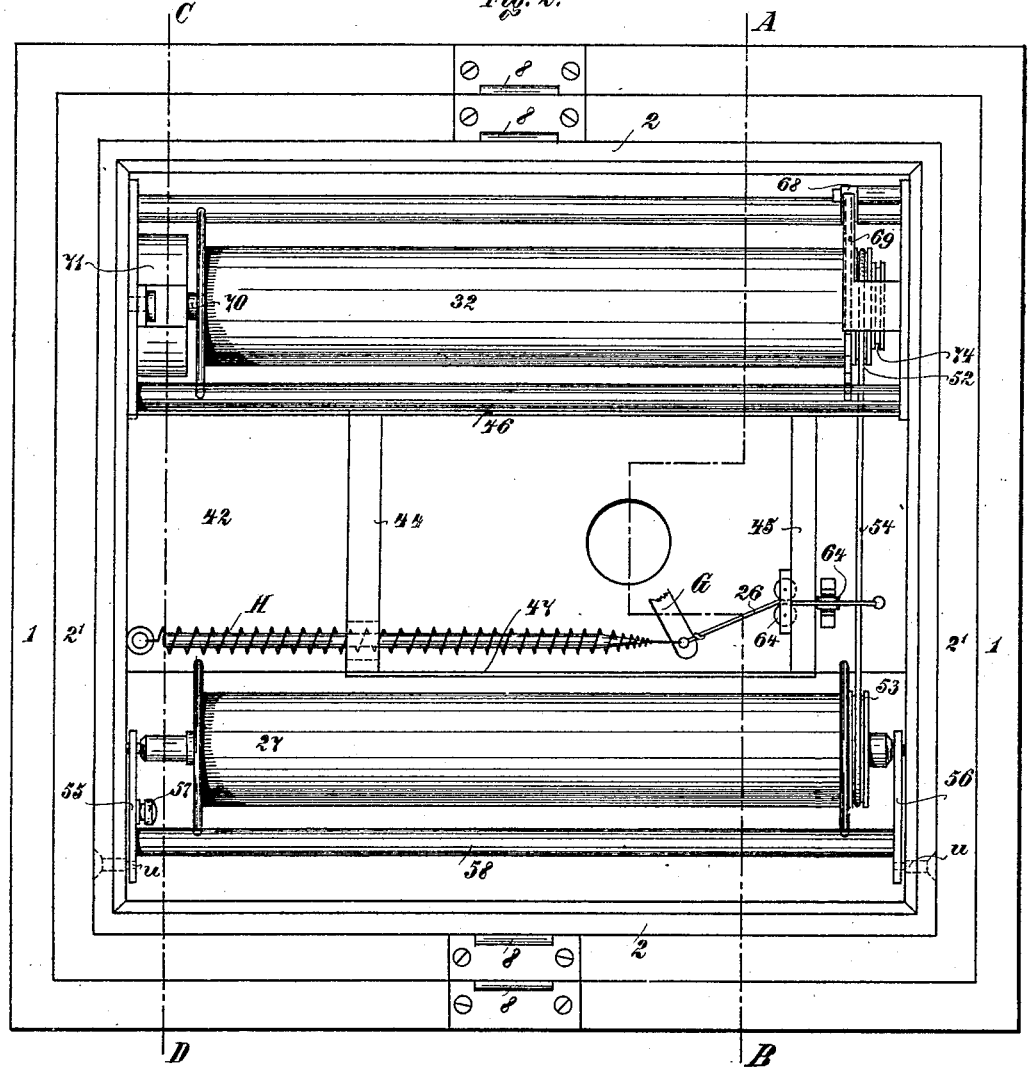

The camera is shown in Figure 1 in an extended condition, in longitudinal section, taken on line A—B, of Fig. 2. Fig. 2 shows a front elevation of the camera, with the front removed. Fig. 3 shows the camera in a closed, telescoped, or collapsed condition, in longitudinal section, taken on line C—D, Fig. 2. Fig. 4 shows a shutter, as specially devised by the inventor for use in the camera herein described, but which, of course, can be applied to other existing cameras. Figs. 5, 6, and 7 show details.

The camera consists, as shown in Figs. 1 and 3, of two or more telescoped sections, 1, 2', 2 comprising a housing. This device, of course, can be so modified that a single collapsible bag or bellows may take the place of the sections, so arranged that when it has become extended to the desired degree, as determined by experiment, it will become fixed, and this may be accomplished by means of guides, lazy tongs, or the like. Furthermore, it is entirely immaterial whether the objective is moved forward, or the picture surface is moved rearward. As already mentioned, in the device shown in the drawings one former movement takes place. The fixing of the several sections, 1, 2' and 2, after the camera is extended, is accomplished by means of the catches, spring pawls, &c., 8, which are secured to the sections, 2', and 2. These spring pawls rise from their slots when the camera is fully extended, and press against the sections next to them. Thus the springs on section, 2', press against the section, 1 and those of section, 2, against section, 2', of the housing. This manipulation is accompanied by a distinctly audible snap, which also gives notice that the camera is fully extended, and that all the operations preparatory to taking a picture, as described below, have taken place, and that the camera is ready for action. The shutter is not placed directly on the front side of the camera, but is placed farther back on a partition, 42, which is joined to the front, 43, of the camera, by means of cover, 44, and bottom, 45, and side walls, 46 and 47, so as to exclude all the light from the exterior to the interior of the camera. The objective is placed in a sleeve, 48, secured to the front, 43. The partition, 42, is connected to another partition, 49, in the rear part, 1, of the camera, by means of the bellows, 50. An opening, 51, Fig. 1, in partition, 49, exposes only so much of the film as is to be illuminated, corresponding to the size of the picture to be taken. The exposure of the rest of the film is wholly prevented by the bellows. The roll 27 containing the film or sensitized paper, is located in section, 2, to the left of the objective. From this roll, the film passes near the opening, 51, past partition 49, to the receiving roll, 32, passing over guide rolls 29 and 30, secured to the camera partition, 49, the direction being indicated by the arrow, and the film being shown by dotted lines in Fig. 1.

The arrangement and operation of the delivery and receiving rolls are the following: Both rolls are provided with grooved pulleys, 52 and 53, and are joined by a cord, 54, in such a manner that they can rotate in opposite directions. In order to maintain a tension between the two rolls, the delivery roll is spring-held, being journaled in two yokes, 55, and 56, movable about a center, $u$, secured to the top and bottom of the camera, the yoke, 55, being constantly pulled by a spring, 57. Both yokes, 55 and 56, are joined together by means of a rod, 58, so that the pull exerted on one yoke by means of spring, 57, is transmitted to the other yoke, and both yokes are constantly parallel to each other. The delivery roll can be turned in either direction, according to the direction of movement of the cord, 54. The receiving roll, 32, is arranged as follows, and as shown in detail in Figs. 5 to 8: The roll consists of a sleeve, 65, upon which the film coils itself. The sleeve, 65, is provided with two flanges, 66 and 67, which prevent the film from sliding off. The flange, 67, is provided on its periphery with ratchet teeth, (Figs. 1, 3 and 6,) in which a pawl, 68, (Figs. 1 and 3,) catches, being constantly pressed by means of a spring, 69. This ratchet flange, and, consequently, also sleeve, 65, can only turn to the right (in direction of the arrow), an opposite movement being prevented by the pawl. The flange, 67, which is provided with the ratchet teeth, carries on its outer side the cord pulley, 52, and on its inner side, toward the sleeve, a pawl, 80, which is operative in an opposite direction to that of pawl, 68. The receiving roll turns upon a shaft, 70, journaled in the top and bottom of the camera, in such a manner that both may be moved independently of each other. To one end of this shaft, 70, there is secured a spiral spring 72, located in a housing, 71, Figs. 2 and 3. The other end of this shaft, just before it leaves the sleeve, 65, is provided with a toothed wheel, 73, into which catches the pawl, 80, on flange, 67. This end of the shaft is further provided with a cord pulley, 74, over which passes a cord or wire, 76, which is secured to the camera wall at 75. This cord, 76, is coiled upon the cord pulley, 74, when the camera is collapsed.

On taking a picture, the camera is extended, and the spring, 72, is pulled by means of the cord, 76, secured to the back of the camera, and, at the same time, the delivery roll, 27, unrolls the film. During this time, the receiving roll, 32, remains stationary, being prevented from turning by means of the pawl, 68, and, during the extension of the camera, the shutter is set by means of cord, 26, as will be described later on, and the marking arrangement described below attains the position shown in Fig. 1. After the exposure, the camera is collapsed, thus slacking the cord, 76, and permitting the spiral spring, 72, to operate the receiving roll. The shaft, 70, and sleeve, 65, are coupled together by means of the toothed wheel, 73, and pawl, 80, so as to move together, and the receiving roll takes up a part of the film. As the receiving roll is connected with the delivery roll by means of pulley cord, 54, the delivery roll will also turn, but in an opposite direction to that of the receiving roll, and it, too, will take up some of the film. In collapsing the camera, the marking device, mentioned above, is also put into operation, and accurately marks the divisions between the pictures, thus greatly simplifying the cutting of the same. This marking device is arranged as follows: On the top and bottom of the rear section, 1, to one side of the partition, 49, two angle pieces turn upon pivots, 59, and are joined together by means of a rod, 61, which carries the marking pins, a. When the camera is extended, the marking device is pressed away from the film, and against the rear wall, 63, by means of a spring, 62, and when the camera is collapsed, the front section, 2, strikes against the angle pieces, 60, and these turn on the pivots 59 and the pins, a, perforate the film, (Fig. 3.)

Any suitable shutter-device may be employed. Moreover, finders for determining the height and field may be arranged on my apparatus.

What I claim as new, and desire to secure by Letters Patent, is—

1. In a photographic apparatus, a housing, a yoke, pivoted in the front portion of the housing, a delivery roll journaled in the yoke, a receiving roll journaled above the delivery roll, a cord or belt communicating motion from the receiving roll to the delivery roll, and a spring attached to the housing and to the yoke, whereby the cord is kept normally tight, substantially as set forth.

2. In a photographic apparatus, a collapsible housing, a roll-shaft journaled in the housing, a spiral spring connected to the roll-shaft, a ratchet wheel fixed to said shaft, a sleeve rotatable on the roll-shaft and provided with a pawl engaging the ratchet wheel on the roll-shaft, a ratchet wheel on the sleeve, a pawl secured to the housing and engaging the ratchet wheel on the sleeve, a pulley on the roll-shaft, and a cord wound on the pulley and connected to the back of the housing, whereby, when the housing is extended, the spiral spring will be wound, and, when the housing is collapsed, the sleeve will be rotated by the spiral spring, substantially as set forth.

3. In a photographic apparatus, a collapsible housing, a yoke pivoted in the front portion of the housing, a delivery roll journaled in the yoke, a cord-pulley fixed on the delivery roll, a roll-shaft journaled in the front portion of the housing above the delivery roll, a spiral spring attached to the roll-shaft, a ratchet wheel and a cord pulley fixed on the roll-shaft, a sleeve rotatable on the roll-shaft and provided with a pawl engaging the ratchet wheel on the roll-shaft, a ratchet wheel fixed on the sleeve, a pawl secured to the housing and engaging the ratchet wheel, a cord wound on the cord-pulley on the roll-shaft and secured at one end to the rear of the housing, a cord-pulley fixed on the sleeve, a cord passing around the pulley on the sleeve and around the pulley on the delivery roll, a pair of rollers in the rear portion of the housing, and a spring secured to the housing and to the yoke, substantially as set forth.

4. In a photographic apparatus, a collapsible housing, a series of film-rollers journaled in the housing, and a marking device arranged to mark the film, and actuated by the collapsing of the housing, substantially as set forth.

5. In a photographic apparatus, a collapsible housing, a series of film-rolls journaled in the housing, a punch located in the rear portion of the housing, and means for forcing the punch against the film when the housing is collapsed, substantially as set forth.

6. In a photographic apparatus, the combination, with a collapsible housing, of a pair of angle-arms pivoted in the housing, a rod connecting the angle-arms and provided with a punch, and a spring tending to hold the punch away from the film, substantially as set forth.

In testimony that I claim the foregoing as my invention I have signed my name in presence of two subscribing witnesses.

ALOIS DELUG.

Witnesses:
ALBERT ANSEL,
MAX. ZINK.